United States Patent [19]
Basile et al.

[11] Patent Number: 5,546,421
[45] Date of Patent: Aug. 13, 1996

[54] SELF COMPENSATING SPREAD-SPECTRUM HYBRID

[75] Inventors: Philip C. Basile, Turnersville, N.J.; James E. Thompson, Jr., Lansdale, Pa.; David Kline, Maple Shade; Gary E. Toner, Collingswood, both of N.J.

[73] Assignee: Martin Marietta Corp., Camden, N.J.

[21] Appl. No.: 293,979

[22] Filed: Aug. 22, 1994

[51] Int. Cl.⁶ .................................................. H04B 15/00
[52] U.S. Cl. .......................... 375/200; 375/214; 379/343; 379/345; 379/402; 455/237.1; 333/117; 333/15
[58] Field of Search .................................... 379/343–347, 379/402–404; 375/200, 206, 208, 211, 214, 373, 345; 455/120, 125, 232.1, 237.1; 333/4, 117, 124, 15, 17.1, 17.3

[56] References Cited

U.S. PATENT DOCUMENTS

| | | | |
|---|---|---|---|
| 4,207,525 | 6/1980 | Martel et al. | 455/109 |
| 4,757,530 | 7/1988 | Arnon | 379/404 |
| 4,943,973 | 7/1990 | Werner | 375/200 |
| 5,333,194 | 7/1994 | Caesar | 379/402 |

Primary Examiner—Stephen Chin
Assistant Examiner—Amanda T. Le
Attorney, Agent, or Firm—W. H. Meise; G. H. Krauss; S. A. Young

[57] ABSTRACT

A communications station (10) couples a bidirectional input-output signal path (16') to two unidirectional signal paths; a transmit signal path (12') and a receive signal path (14'), using a controllable hybrid (20). A feedback control system in the station minimizes the amount of transmit signal appearing at the receive output port (24) of the hybrid (20). The control system spreads the spectrum of a pilot signal (40) by means of a biphase modulator (46) and a pseudo-random generator (42) to produce a spread-spectrum pilot, which is added, in a summer 30, to the transmit signal. The spread-spectrum pilot signal covers the bandwidth of the information signal, and is reflected in an amount and with a phase which depends upon the relative impedance presented to the hybrid (20) by the bidirectional signal path (16'). The receive signal, which arrives at the station bidirectional port (16) from the bidirectional path, is coupled from the hybrid (20) to a spread-spectrum demodulator (56), which regenerates the own-station pilot signal with a phase which depends upon the impedance presented by the bidirectional signal path to the hybrid. The pilot signal is phase-detected (64), processed, and applied to the hybrid to degeneratively minimize the amount of transmit signal coupled to the receive port (14).

5 Claims, 2 Drawing Sheets

SELF COMPENSATING SPREAD-SPECTRUM HYBRID

FIELD OF THE INVENTION

This invention relates to communication systems, and more particularly to duplex communications systems in which a bidirectional transmission path is coupled to two unidirectional signal paths by a directional hybrid, and specifically to such an arrangement in which a pilot signal controls the hybrid to maximize the isolation.

BACKGROUND OF THE INVENTION

Bidirectional communication systems are ubiquitous in modern society, with one example being the telephone system, and another being bidirectional or interactive cable television. It is ordinarily advantageous to use a single transmission path for the bidirectional transmission, to reduce the number of conductors or optical fibers extending between the stations which are communicating. When a bidirectional signal path is used, the equipment at each end must ultimately separate the signals into incoming and outgoing portions, so that they may be applied to the appropriate one of a display device or earphone, and so that signals produced by a camera or microphone at the same location do not interfere with the signal received from a remote location. The separation of signals in response to their direction of transmission is accomplished by a device known as a hybrid. When operating properly in a telephone system, the hybrid isolates the signals flowing in different directions from each other, and prevents "echoes" or ringing which arise from a tendency toward signal oscillation which results from circulation of transmit signals in a receive unit which leak into the receive unit and back into the transmit path. Hybrids exhibit optimum performance, defined as transmit-to-receive isolation, when the minimum amount of transmit signal appears at the receive signal port. This maximum isolation is achieved when the bidirectional signal transmission path presents an impedance to the bidirectional signal port of the hybrid which matches the impedance for which the hybrid is designed. Desirable isolation may range from about 30 to 50 dB, depending upon the application. Isolations as low as 10 dB may result from transmission-path impedances which deviate by a factor of two or three from the design impedance. Thus, impedances which are two or three times the hybrid design impedance, or which are one-half or one-third the design impedance, may adversely affect the isolation.

Unfortunately, the impedance presented by the bidirectional signal path to the hybrid depends upon such factors as the number of terminal units, as for example telephone units, connected thereto, and the characteristics of the individual terminal units. The load impedance presented to a hybrid may change dynamically during operation, as might occur if an extension telephone is picked up during a conversation already in progress. The problems resulting from such impedance changes have in the past often been ignored, or corrected by digital echo cancellers. Digital echo cancellers rely on voice activation, and as a result may have short periods of echo which are detectable by the user.

SUMMARY OF THE INVENTION

A hybrid according to the invention is optimized based upon the amount of pilot signal appearing at the various ports under operating conditions. In order to allow the pilot signal to appear in-band so that the hybrid is optimized at frequencies which the hybrid is actually using, the pilot signal is a spread-spectrum signal. In a particular embodiment of the invention, a communication system station converts between a single bidirectional transmission path and first and second unidirectional transmission paths. The station comprises a controllable hybrid with a bidirectional port coupled to the bidirectional transmission path, a signal input port for receiving signal to be coupled to the bidirectional port, a signal output port to which signal received at the bidirectional port from the bidirectional transmission path is coupled, and a control input port for receiving a control signal, for controlling the isolation between signals flowing among the bidirectional, input and output ports. The station also includes a source of pilot signals, a spread-spectrum code generator, and a spread-spectrum modulator for distributing the pilot signals across a spectrum of interest by arrangement of the spread-spectrum code, to thereby generate a spread-spectrum pilot signal. The station also includes a summer arrangement coupled to the spread-spectrum modulator, to the first unidirectional transmission path, and to the signal input port of the hybrid, for summing together transmit signals received from the first unidirectional transmission path with the spread-spectrum pilot signals, and for applying the signals so combined to the signal input port of the hybrid, whereby the spread-spectrum pilot signals are coupled to the bidirectional port of the hybrid, transmitted, and may be reflected from the load back to the bidirectional port of the hybrid. The station also includes a spread-spectrum demodulator coupled to the spread-spectrum code generator and to the signal output port of the hybrid, for decoding, with the aid of the spread-spectrum code, that component of the spread-spectrum pilot signal which appears at the signal output port of the hybrid, to thereby regenerate the pilot signal. A phase comparator is coupled to the source of pilot signals and to the spread-spectrum demodulator for generating the control signal, for closing a degenerative feedback loop which maximizes the isolation of the hybrid. In a particular embodiment of the invention, the hybrid includes a first amplifier with an inverting input port and an output port, and a first resistor including first and second terminals. The first terminal of the first resistor is coupled to the output port of the first amplifier. An input resistor is coupled to the signal input port of the hybrid and to the inverting input port of the first amplifier. A feedback resistor is coupled to the inverting input port of the first amplifier and to the second terminal of the first resistor, for closing a feedback loop about the first amplifier which establishes a predetermined or given gain between the input port of the hybrid and the second terminal of the first resistor. A fourth resistor includes a first terminal coupled to the second terminal of the first resistor and a second terminal coupled to the bidirectional port of the hybrid, whereby the voltages appearing at the first and second terminals of the first resistor depend upon the impedance presented to the bidirectional port by the bidirectional transmission path. A gain-controllable amplifier includes a gain control input port for receiving the control signal, and also includes a signal input port coupled to the first terminal of the first resistor, for amplifying the output signal of the first amplifier by an amount established by the control signal, to thereby produce a gain-controlled signal. A summing arrangement is coupled to the second terminal of the first resistor and to the gain-controllable amplifier for summing the gain-controlled signal with the signal appearing at the second terminal of the first resistance arrangement.

DESCRIPTION OF THE INVENTION

Figure 1:
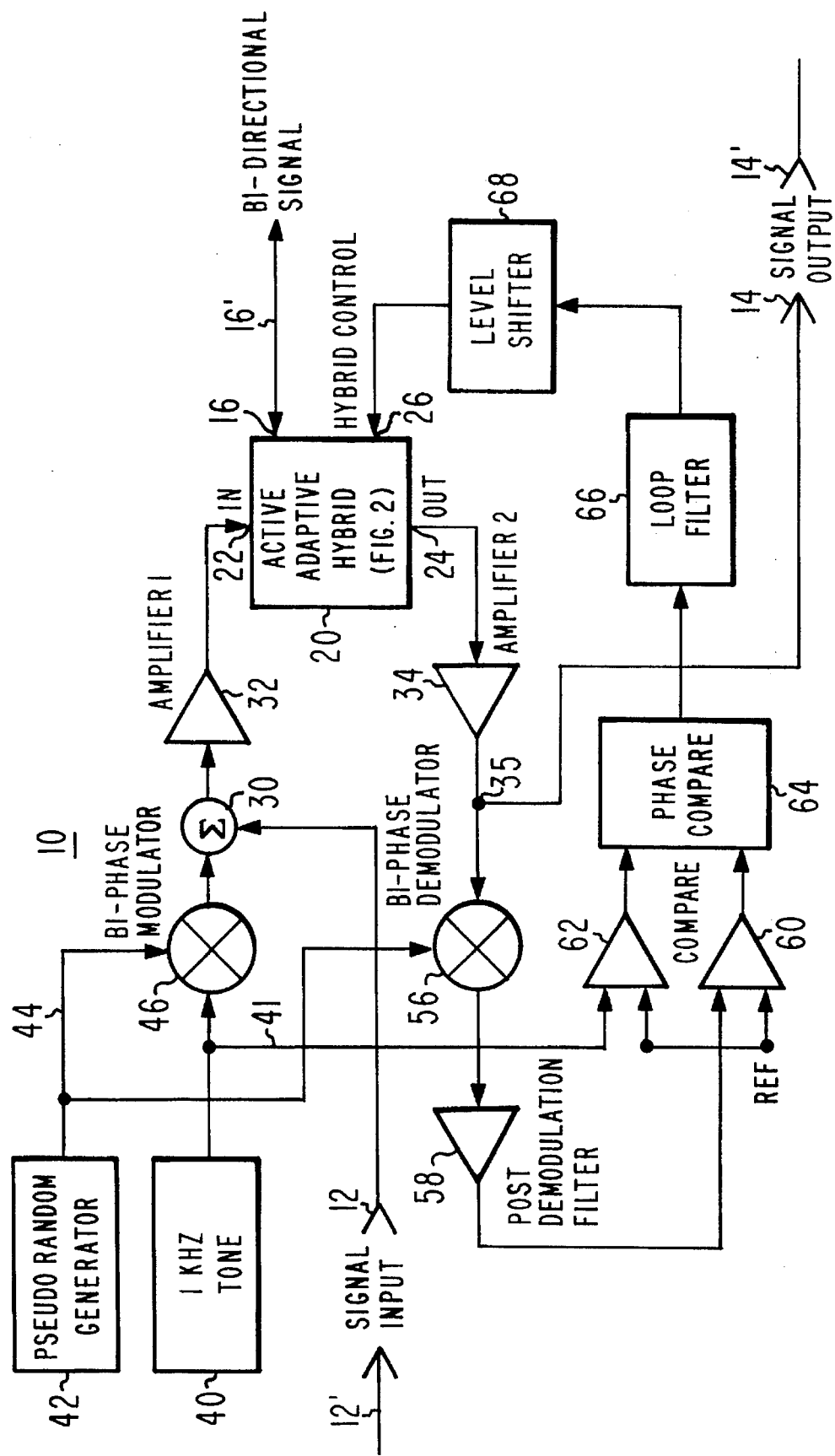
FIG. 1 is a simplified block diagram of a communication system station in accordance with an aspect of the invention.

FIG. 1 is a simplified block diagram of a communications station 10 according to the invention, in which two unidirectional signal paths are coupled to a single bidirectional signal path. Station 10 includes a unidirectional signal input port or transmit signal port 12, a unidirectional signal output port or receive signal port 14, and a bidirectional signal port 16. The corresponding unidirectional signal paths are represented by 12' and 14', and the bidirectional transmission line is represented by 16'.

A unidirectional-to-bidirectional hybrid 20 of FIG. 1 includes a unidirectional signal input port 22, a unidirectional signal output port 24, a control signal input port 26, and the station bidirectional input-output port 16. Unidirectional information signal applied to station signal input port 12 is coupled to an input port of a summing circuit 30, where the signal is summed with a pilot signal, as described in more detail below. The summed information and pilot signals from summer 30 are applied by way of an amplifier 32 to unidirectional signal input port 22 of hybrid 20. Ideally, hybrid 20 couples the signals applied to input port 22 to bidirectional port 16, and not to output port 24, for transmission by way of transmission path 16' to a remote station or stations. Signals received from bidirectional signal transmission path 16' at bidirectional input-output port 16 of hybrid 20 are ideally applied only to output port 24 of hybrid 20, and not to input port 22. From output port 24 of hybrid 20, received signals are applied through an amplifier 34, and flow by way of node 35 to signal output port 14. Signal which enters input-output port 16 from bidirectional signal transmission path 16' and which flows out of signal port 22 is not propagated through amplifier 32.

The ideal operation, described above, of the arrangement of FIG. 1, may not be achieved in practice. Inaccuracies in the hybrid allow some leakage of signals among the ports, and incorrect terminating impedances may allow sufficient leakage to cause unsatisfactory operation of the communication system. According to an aspect of the invention, a spread-spectrum pilot signal is used to aid in adjusting the hybrid. The pilot signal itself is generated by a tone generator 40, which in one embodiment of the invention may generate a 1 KHz. tone, which is applied over a signal path 41 to an input port of a biphase modulator 46. Biphase modulator 46 also receives a pseudorandom code from a generator 42 by way of a signal path 44, and the code modulates the pilot signal in modulator 46 to produce a spread-spectrum pilot signal. The spread-spectrum pilot signal is applied from modulator 46 to another input port of summer 30, in which it is added to the transmit information signal, as described above. The spread-spectrum pilot signal has the advantage that it is distributed across a broad bandwidth, and may extend across the signal bandwidth, but with such low power per Hz. that it is generally imperceptible to a user.

The signal received at bidirectional input-output port 16 of hybrid 20 of FIG. 1 is coupled by way of amplifier 34 to station output port 14, as described above, and is also applied to the input port of a biphase demodulator 56, which receives the pseudorandom code from generator 42 by way of signal path 44. Biphase demodulator 56 decodes the pilot component of the signal applied to its input port, and couples the demodulated pilot tone to a post-demodulation filter 58, which in the case of a 1 KHz. pilot tone is simply a 1 KHz. bandpass filter, which removes information signal components of the received signal, and leaves only the pilot information. The decoded, filtered received pilot tone is applied from filter 58 to the input port of a comparator 60, which compares the instantaneous value of the signal with a reference, such as zero voltage, to produce a rectangular-wave signal having two logic levels. The phase of the demodulated pilot signal is responsive to the impedance presented to input-output port 16 of hybrid 20 by bidirectional transmission path 16'. The rectangular-wave signal from comparator 60 is applied to a phase comparator 64, together with a phase reference signal produced by another comparator, 62, which receives the same reference voltage as comparator 60, and compares it with the original pilot signal from generator 40.

Phase comparator 64 compares the phases of the original pilot signal from generator 40, as compared by comparator 62, with the phase of the pilot signal which has passed through the hybrid, as decoded by demodulator 56, filtered by filter 58, and compared by comparator 60, to produce a phase-representative signal, which includes information relating to the impedances presented to the ports of hybrid 20, its inherent balance, or a combination of the two. The phase information is coupled from phase comparator 64, by way of a loop filter 66 and a level shifter 68 to the control input port 26 of hybrid 20, for controlling the operation of the hybrid in a degenerative feedback manner which tends to maintain the balance or isolation of the hybrid in the presence of variations in impedance at the bidirectional input port 16 of the hybrid. Loop filter 66 stabilizes the feedback loop in well-known fashion, and may for this purpose include, for example, an integrator with a time constant selected for stability, which also has the property of reducing the alternating component of the output signal from phase detector 64. Level shifter 68 simply translates the control signal to a level which is compatible with the requirements of the hybrid circuits; such circuits often include diodes or Zener diodes for offsetting the control voltage at lower impedance levels, or at higher impedance levels may include voltage dividers.

Figure 2:
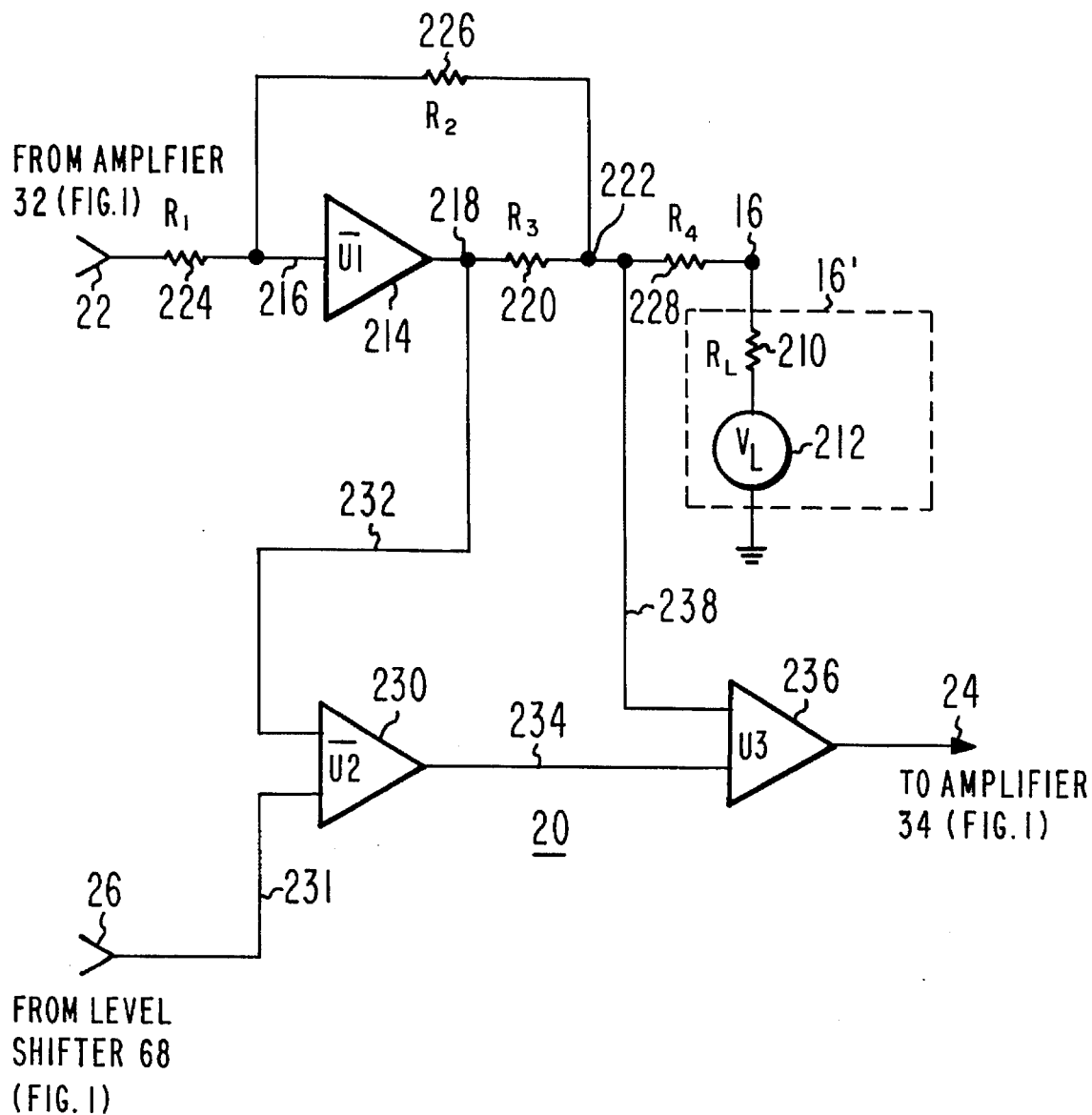
FIG. 2 is a simplified diagram, partially in block form, and partially in schematic form, which represents a controllable hybrid, which may be used in the arrangement of FIG. 1.

Hybrid circuit 20 is illustrated in more detail in FIG. 2. Elements of FIG. 2 which correspond to those of FIG. 1 are designated by like reference numerals. In FIG. 2, the impedance presented to bidirectional input-output port 16 by transmission path 16' is represented by a resistor 210, which is also designated $R_1$. When station 10 of FIG. 1, of which hybrid 20 of FIG. 2 is a part, is in a transmitting mode, resistor 210 is the impedance across which the signal is developed. A voltage generator 212 in FIG. 2 represents the signal voltage which appears at input-output port 16 of hybrid 20 as a result of transmission of signal by a remote station. It should be noted that, since the stations are bidirectional, both the illustrated station and other stations to which it is connected may be transmitting simultaneously, as a result of which the voltage $V_L$ produced by source 212 may exist during transmission by the station of which hybrid 20 of FIG. 2 is a part.

As illustrated in FIG. 2, hybrid 20 includes an amplifier 214 with an inverting input port 216 and an output port 218. A resistor 220, also designated $R_3$, has one end or terminal connected to output port 218, and another end connected to a node 222. An input resistor 224, also designated $R_1$, is connected at one end to unidirectional input port 22 of hybrid 20, and at the other end to inverting input port 216 of amplifier 214. A feedback resistor 226, also designated $R_2$, has one terminal connected to input port 216 and its other terminal connected to node 222. Feedback resistor 226 coacts with input resistor 224 in well-known fashion to establish the gain between input port 22 and node 222 at $-R_2/R_1$. A further resistor 228, also designated $R_4$, has one terminal connected to node 222 and the other terminal connected to bidirectional input-output port 16.

In FIG. 2, amplifier 230 is a gain-controllable inverting amplifier, which inverts and amplifies the signal applied to its inverting (−) input port by way of signal path 232, with a gain established by a control signal applied to its control input port, by way of a signal path 231, from hybrid control input port 26. The gain-controlled amplified signal at the output port of amplifier 230 is applied over a signal path 234 to a summing amplifier 236. The gain-controlled signal applied to summing amplifier 236 by way of path 234 is summed with the voltage on node 222, which is coupled to summing amplifier 236 by way of a signal path 238.

In transmit operation, the transmit information signal applied to signal input port 12 of station 10 is combined with the spread-spectrum pilot signal generated by generators 40 and 42 and modulator 46, as described above, and the combined signal is transmitted to unidirectional input port 22 of hybrid 20. Amplifier 214 amplifies the signal with a gain established by $-R_2/R_1$, creating a virtual ground at its inverting input port 216, as known in the art, and producing the amplified transmit signal at node 222. When resistors 220 and 228 are set equal to the impedance presented by the external load (the resistance of resistor 210) connected to bidirectional port 16, or in other words when $R_3=R_4=R_L$, the transmit signal voltage at node 218 will be $R_L/R_3+R_4+R_L=1.5$ times greater than the voltage at port 16, and the ratio will vary as a function of the load impedance $R_L$. More particularly, when $R_L=0$, which is when bidirectional port 16 is effectively grounded, the voltage at node 218 will be twice the voltage at node 222. When $R_L$ is infinite or open-circuited, the voltage at node 218 will equal the voltage at node 222. Thus, the magnitude of the signal at node 218 varies between a value equal to that at node 222 to a value to a value twice that at node 222, depending upon the impedance presented to bidirectional port 16. The signal at node 218 is amplified in amplifier 230 by an amount controlled by the hybrid control signal applied to control port 26, this amount is set, for example, to 1/1.5, or 0.666 when $R_3=R_4=R_L$, so that the magnitude of the transmit signal produced by amplifier 230 on signal path 234 equals the magnitude of the transmit signal on signal path 238, but is inverted; summing amplifier 236 then receives two equal and opposite versions of the transmit signal, which sums to zero transmit signal at unidirectional output port 24. This is the definition of perfect hybrid coupling, namely zero transmit signal appearing at the unidirectional output port during transmission. Naturally, this perfection occurs only in the theory, and in actual practice some leakage inevitably occurs.

In transmit operation, the control loop of FIG. 1 responds to that component of the spread-spectrum pilot signal which is produced at output port 24 of hybrid 20. If the gain of gain-controlled amplifier 230 of FIG. 2 is not at the correct value, so that a net signal appears at the output of summing circuit 236 of FIG. 2 and at output port 24 of FIG. 1, the spread-spectrum pilot signal is decoded by demodulator 56 of FIG. 1, the pilot tone component is filtered by filter 58, and the phase of the pilot tone is detected by comparator 64. When the impedance of hybrid 20 is below the load impedance presented by bidirectional signal path 16', the phase difference between the outputs of comparators 60 and 62 is zero degrees. When the impedance of hybrid 20 is above the load impedance presented by bidirectional signal path 16', the phase difference is 180 degrees. In operation of the feedback loop in its closed condition, phase detector 64 produces a control signal with a value which establishes the pilot phase near the 0°-to-180° transition, and which varies to maintain the gain of the gain-controlled amplifier 230 of FIG. 2 near that value which minimizes the magnitude of the transmitted pilot carrier which flows from the receive output port 24 of hybrid 20 of FIGS. 1 and 2.

In receive operation, a desired signal is received at bidirectional signal port 16 from bidirectional signal path 16' and is coupled through amplifier 34 of FIG. 1 to node 35 and to unidirectional signal output port 14. An advantage of the described system is that the desired signal at node 35 is spread-spectrum modulated by biphase demodulator 56, rather than demodulated. The spectrum of the desired received signal is spread across a bandwidth much greater than the bandwidth of filter 58, so little of the received signal energy enters the control loop. This tends to isolate the control loop from the received signal.

Other embodiments of the invention will be apparent to those skilled in the art. For example, a band-limiting bandpass filter may be coupled between the output of biphase modulator 46 of FIG. 1 and summer 30, to limit the bandwidth of the spread-spectrum pilot signal to equal the spectral bandwidth of the signal being transmitted to the next station, so that out-of-band impedance errors do not influence the isolation of the hybrid. While a plurality of interconnected stations may be used, each of which is similar to station 10 of FIG. 1, it is desirable that the spectrum-spreading codes not be coincident, in order to prevent the pilot signal transmitted by one station from affecting the control loop of another station; in the case of unsynchronized pseudorandom code generators with a long code length, the other stations will generally not be affected, unless the stations are all turned on at the same time, in which case the pseudorandom generators may start in the same state, and maintain synchronism for some length of time. This disadvantage of pseudorandom code generators may be overcome by using, at each station, true random noise generators, such a noise diode followed by a clipper. As an alternative, some or all of the stations may have mutually orthogonal pseudorandom codes, which produce no net decoded output even if in synchronism.

What is claimed is:

1. A communication station for converting between a single bidirectional transmission path and first and second unidirectional transmission paths, said station comprising:

a controllable hybrid including a bidirectional port coupled to said bidirectional transmission path, a signal input port for receiving signal to be coupled to said bidirectional port, a signal output port to which signal received at said bidirectional port from said bidirectional transmission path is coupled as received signals, and a control input port for receiving a control signal, for controlling the isolation between signals flowing among said bidirectional, input and output ports;

a source of pilot signals;

spread-spectrum signal generating means for generating spread-spectrum signals;

spread-spectrum modulation means coupled to said source of pilot signals and to said spread-spectrum signal generating means for distributing said pilot signals across a spectrum by means of said spread-spectrum signals, to thereby generate spread-spectrum pilot signals;

summing means coupled to said spread-spectrum modulation means, to said first unidirectional transmission path, and to said signal input port of said hybrid, for summing together transmit signals received from said first unidirectional transmission path with said spread-spectrum pilot signals, and for applying the signals so combined to said signal input port of said hybrid, whereby said spread-spectrum pilot signals are coupled to said bidirectional port of said hybrid, and may appear at said signal output port of said hybrid;

spread-spectrum demodulation means coupled to said spread-spectrum signal generating means and to said signal output port of said hybrid, for decoding, with the aid of said spread-spectrum signal, that component of said spread-spectrum pilot signals which appear at said signal output port of said hybrid, to thereby regenerate said pilot signals; and phase comparison means coupled to said source of pilot signals and to said spread-spectrum demodulation means for generating said control signal, and for closing a degenerative feedback loop which maximizes the isolation of said hybrid.

2. A system according to claim 1, wherein said spread-spectrum signal generating means comprises a pseudorandom signal generator.

3. A communication station for converting between a single bidirectional transmission path and first and second unidirectional transmission paths, said station comprising:

a controllable hybrid including a bidirectional port coupled to said bidirectional transmission path, a signal input port for receiving signal to be coupled to said bidirectional port, a signal output port to which signal received at said bidirectional port from said bidirectional transmission path is coupled as received signals, and a control input port for receiving a control signal, for controlling the isolation between signals flowing among said bidirectional, input and output ports;

a source of pilot signals;

spread-spectrum signal generating means for generating spread-spectrum signals;

spread-spectrum modulation means coupled to said source of pilot signals and to said spread-spectrum signal generating means for distributing said pilot signals across a spectrum by means of said spread-spectrum signals, to thereby generate spread-spectrum pilot signals;

summing means coupled to said spread-spectrum modulation means, to said first unidirectional transmission .path, and to said signal input port of said hybrid, for summing together transmit signals received from said first unidirectional transmission path with said spread-spectrum pilot signals, and for applying the signals so combined to said signal input port of said hybrid, whereby said spread-spectrum pilot signals are coupled to said bidirectional port of said hybrid, and may appear at said signal output port of said hybrid;

spread-spectrum demodulation means coupled to said spread-spectrum signal generating means and to said signal output port of said hybrid, for decoding, with the aid of said spread-spectrum signal, that component of said spread-spectrum pilot signals which appear at said signal output port of said hybrid, to thereby regenerate said pilot signals; and phase comparison means coupled to said source of pilot signals and to said spread-spectrum demodulation means for generating said control signal, and for closing a degenerative feedback loop which maximizes the isolation of said hybrid;

and wherein said hybrid comprises:

a first amplifier including an inverting input port and an output port;

first resistance means including first and second terminals, said first terminal of said first resistance means being coupled to said output port of said first amplifier;

input resistance means coupled to said signal input port of said hybrid and to said inverting input port of said first amplifier;

feedback resistance means coupled to said inverting input port of said first amplifier and to said second terminal of said first resistance means, for closing a feedback loop about said first amplifier which establishes a given gain between said input port of said hybrid and said second terminal of said first resistance means;

fourth resistance means including a first terminal coupled to said second terminal of said first resistance means and a second terminal coupled to said bidirectional port of said hybrid, whereby the voltages appearing at said first and second terminals of said first resistance means depend upon the impedance presented to said bidirectional port by said bidirectional transmission path;

gain-controllable amplification means including a gain control input port for receiving said control signal, and also including a signal input port coupled to said first terminal of said first resistance means, for amplifying the output signal of said first amplifier by an amount established by said control signal, to produce a gain-controlled signal; and summing means coupled to said second terminal of said first resistance means and to said gain-controllable amplifying means for summing said gain-controlled signal with the signal appearing at said second terminal of said first resistance means.

4. A communication station for converting between a single bidirectional transmission path and first and second unidirectional transmission paths, said station comprising:

a controllable hybrid including a bidirectional port coupled to said bidirectional transmission path, a signal input port for receiving signal to be coupled to said bidirectional port, a signal output port to which signal received at said bidirectional port from said bidirectional transmission path is coupled as received signals, and a control input port for receiving a control signal, for controlling the isolation between signals flowing among said bidirectional, input and output ports;

a source of pilot signals;

spread-spectrum signal generating means for generating spread-spectrum signals;

spread-spectrum modulation means coupled to said source of pilot signals and to said spread-spectrum signal generating means for distributing said pilot signals across a spectrum by means of said spread-spectrum signals, to thereby generate spread-spectrum pilot signals;

summing means coupled to said spread-spectrum modulation means, to said first unidirectional transmission path, and to said signal input port of said hybrid, for summing together transmit signals received from said first unidirectional transmission path with said spread-spectrum pilot signals, and for applying the signals so combined to said signal input port of said hybrid, whereby said spread-spectrum pilot signals are coupled to said bidirectional port of said hybrid, and may appear at said signal output port of said hybrid;

spread-spectrum demodulation means coupled to said spread-spectrum signal generating means and to said signal output port of said hybrid, for decoding, with the aid of said spread-spectrum signal, that component of said spread-spectrum pilot signals which appear at said signal output port of said hybrid, to thereby regenerate said pilot signals; and phase comparison means coupled to said source of pilot signals and to said spread-spectrum demodulation means for generating said control signal, and for closing a degenerative feedback loop which maximizes the isolation of said hybrid;

wherein said hybrid comprises:

voltage division means including a first end coupled to receive signal from said signal input port of said hybrid, and a second end coupled to said bidirectional input-output port of said hybrid, said voltage division means including first and second serially connected resistance means, with a tap therebetween;

gain-controllable amplification means including a gain control input port for receiving said control signal, and also including a signal input port coupled to said first end of said voltage division means, for amplifying the signal applied to said voltage division means by an amount established by said control signal, to produce a gain-controlled signal; and summing means coupled to said tap and to said gain-controllable amplifying means for summing said gain-controlled signal with the signal appearing at said tap, to produce said received signals.

5. A system according to claim 4, further comprising:

input resistance means including a first terminal coupled to said input port of said hybrid, said input resistance means including a second terminal;

amplifying means including an inverting input port coupled to said second terminal of said input resistance means and also including an output port coupled to a first terminal of said first resistance means, for amplifying signal applied to said signal input port of said hybrid, and applying amplified signal to said first resistance means of said voltage division means;

feedback resistance means coupled to said inverting input port of said amplifying means and to a second terminal of said first resistance means, for establishing the gain between said signal input port of said hybrid and said second terminal of said first resistance means.

* * * * *